Patented Aug. 15, 1939

2,169,366

UNITED STATES PATENT OFFICE 2,169,366

MOISTUREPROOF MATERIAL AND METHOD OF MAKING THE SAME

Frederick M. Meigs, Niagara Falls, N. Y., assignor to E. I. du Pont de Nemours & Company, Wilmington, Del., a corporation of Delaware No Drawing. Application May 27, 1937, Serial No. 145,093

39 Claims. (Cl. 91—68)

This invention relates to the art of moistureproofing. More particularly, it relates to moistureproofing compositions which can be applied from aqueous mixtures. Still more particularly, it relates to non-fibrous sheets and films coated with moistureproofing compositions.

Moistureproofing compositions and materials moistureproofed therewith are well known in industry. One of these materials, comprising regenerated cellulose coated with a moistureproofing composition containing a cellulose derivative, a blending agent, a plasticizer and a wax, has found extensive use in commerce as a wrapping material for protection against gain or loss of moisture from the atmosphere. Such moistureproofing compositions are customarily applied from a solution in organic solvents.

It is an object of this invention to formulate new and useful moistureproofing compositions. It is a further object to formulate such compositions which can be applied from aqueous mixtures. It is a still further object to formulate moistureproofing compositions which can be easily and quickly applied to water sensitive non-fibrous sheets and films. Further objects will appear hereinafter.

As well known in the art, the essential ingredients of a moistureproofing composition are a major proportion of a film-forming material, known as a film-former or base, and a minor proportion of a moistureproofing agent. If the film-former is not compatible with the moistureproofing agent, it is usually necessary to employ, in addition, a blending agent for blending the moistureproofing agent and the film-former. Furthermore, it is also customary in many cases to employ a plasticizer which increases the flexibility and durability of the film and very often contributes to the moistureproofness.

It has now been found in accordance with this invention that by employing as the film-former, a resinous material soluble in dilute acetic acid or dilute ammonium hydroxide, dissolving said film-former in the appropriate aqueous solution, dispersing therein a moistureproofing agent and, if necessary, a blending agent and a plasticizer, that ideal film-forming compositions can be secured which can be cast from aqueous mixtures.

In the preferred form of this invention, this moistureproofing composition is applied to non-fibrous water sensitive sheets and films, particularly regenerated cellulose, while said sheets or films are in the wet or gel state. The thus coated film is then dried, preferably at elevated temperatures, as well known in the art, in order that the proper moistureproofing effect may be secured.

For the purposes of this invention moistureproof materials are defined as those which, in the form of a thin continuous and unbroken film, will permit the passage of not more than 690 grams of water vapor per 100 square meters per hour over a period of 24 hours at approximately 39.5° C.±0.5° C., the relative humidity of the atmosphere at one side of the film being maintained at least at 98% and the relative humidity of the atmosphere at the other side being maintained at such value as to give a humidity differential of at least 95%.

Moistureproofing coating compositions are defined as those which, when laid down in the form of thin continuous unbroken films applied uniformly as a coating with a total thickness not exceeding 0.0005 inch to both sides of a sheet of regenerated cellulose of thickness approximately 0.0009 inch, will produce a coated product which is moistureproof.

For the purpose of experimental tests, especially for those materials adaptable as coating compositions, moistureproof materials include those substances, compounds, or compositions which, when laid down in the form of a continuous unbroken film, applied uniformly as a coating with a total thickness not exceeding 0.0005 inch to both sides of a sheet of regenerated cellulose of thickness approximately 0.0009 inch, will produce a coated sheet which will permit the passage therethrough of not more than 690 grams of water vapor per 100 square meters per hour over a period of approximately 24 hours at a temperature of 39.5° C.±0.5° C. (preferably 39.5° C. ±0.25° C.) with a water vapor pressure differential of 50 to 55 millimeters (preferably 53.4±0.7 millimeters) of mercury. For convenience, the number of grams of water vapor passed under these conditions may be referred to as the "permeability value". An uncoated sheet of regenerated cellulose having a thickness of approximately 0.0009 inch will show a permeability value of the order of 6,900.

From the foregoing, it is apparent that under the conditions set forth, a moistureproof regenerated cellulose sheet is capable of resisting the passage of moisture or water vapor therethrough at least ten times as effectively as the uncoated regenerated cellulose sheet.

As the film-former for the moistureproofing compositions of the present invention, there can be used resinous materials soluble in dilute water soluble acids and bases, particularly dilute organic acids such as acetic or formic acids or dilute ammonium hydroxide. Such film-formers are capable of forming salts with these acids and bases, said salts being soluble in aqueous solutions. Those soluble in acids customarily contain amino groups, known as "amino polymers", and are preferably of the type insoluble in water and in 5% aqueous ammonia, but soluble in 2% aqueous acetic acid, and in which the amino nitrogen may be primary, secondary or tertiary, part of an open chain or of a cyclic molecular structure. Those soluble in bases usually contain free carboxyl groups. It is preferred to use film-formers which are water resistant when not in the form of their salts, although in certain cases those which are somewhat water sensitive when not in the form of their salts may be used. For obvious reasons, of course, they should also be preferably colorless, odorless, tasteless, and light and heat stable. In order to secure the necessary compatibility of the film-former with the moistureproofing agent, the film-forming ingredient should also be soluble in hydrocarbon solvents, and preferably to the extent of at least 10% in toluene. In the case where a blending agent is employed to blend the film-former and the moistureproofing agent, a slightly lower solubility in hydrocarbon solvents can be tolerated. Of the amino polymers which satisfy these requirements, amino alcohol esters of acrylic acid and its homologues substituted in the alpha position by a hydrocarbon radical, such as methacrylic acid, including such resins modified by or interpolymerized with other dissimilar or similar resins, have been found most suitable. Of the film-formers which satisfy these requirements and which are soluble in dilute bases, polybasic acid-polyhydric alcohol type resins containing free (unreacted) carboxyl groups, and particularly those modified by the addition of long-chain acids such as lauric, stearic, and the like, have been found most suitable. Examples of amino polymers are polymeric dicyclohexylaminoethyl alpha-methacrylate, polymeric diethylaminoethyl alpha-methacrylate, N-cyclohexyl N-methylaminoethyl alpha-methacrylate, interpolymers of dicyclohexylaminoethyl alpha-methacrylate and dimethylaminoethyl alpha-methacrylate, interpolymers of dicyclohexylaminoethyl alpha-methacrylate and diethylaminoethyl alpha-methacrylate, interpolymers of dicyclohexylaminoethyl alpha-methacrylate and beta-morpholine-N-ethyl alpha-methacrylate, interpolymers of dicyclohexylaminoethyl alpha-methacrylate and methyl vinyl ketone, the resin prepared by the condensation of p-hydroxydiphenyl, formaldehyde and dimethylamine, and other similar resins, the resin prepared by the reaction of dibutylamine with polyvinyl alpha-chloroacetate (preferably one mol of amine per mol of vinyl alpha-chloroacetate, though other proportions may be used), and other similar resins.

The acid soluble resinous materials useful in the practice of this invention, as mentioned above, are preferably insoluble in water but may be made soluble therein by causing them to react with any one of a large number of water soluble acids including acetic, formic, citric, glycolic, malic, maleic, succinic, adipic, phthalic, tartaric, benzoic, and hydrochloric acid and the like. These water soluble salts, upon being dried, preferably at an elevated temperature, are more or less rapidly rendered insoluble in water. In the case of salts formed by reacting with volatile acids, particularly volatile acids which are only slightly ionized, like acetic acid, the conversion to insolubility is easily and quickly accomplished since the acid, being weak or slightly ionized, is readily dissociated from its salt and, being volatile, is easily removed by heat, leaving an insoluble residue. Salts formed from the non-volatile acids and/or from the highly ionized acids are much less readily converted to insolubility and consequently, in the practice of this invention, it is preferred to use salts of the acid soluble resins with volatile acids of low ionization, of which acetic acid is an example. However, in the case of the salts formed from the non-volatile and/or highly ionized acids, these salts may be converted into the insoluble form by treatment with ammonia as, for example, in the form of gaseous ammonia.

Likewise, in the case of basic soluble film-formers, they are preferably dissolved in the form of their ammonium salts since these can be made water insoluble by driving off ammonia by means of the heat applied during drying. Amine salts such as methylamine, ethanolamine, for example, may be used but are less desirable because they remain water soluble after drying and are not very compatible with moistureproofing agents such as waxes.

The concentration of the film-former in the aqueous solution is preferably 2 to 15%, such as 4 to 12%, depending upon the solubility of the film-former and the use to which the composition is to be put.

As the moistureproofing agent, it has been found preferable to use a wax or wax-like substance and particularly one of rather high melting point. Paraffin waxes of higher or lower melting points may be used, depending upon the degree of moistureproofness and/or the surface characteristics desired. Other waxes such as carnauba wax and Chinese insect wax and mixtures thereof may also be employed. Other materials such as described and claimed in copending application to Charch, Brubaker and Meigs, Serial No. 758,652, and No. 758,654 to No. 758,661, inclusive, filed December 21, 1934, may be used.

In addition to the film-forming ingredient and moistureproofing agent, it is also preferred, as pointed out above, to include a blending agent, preferably a res'n such as rosin, rosin esters, hydrogenated rosin, esters of hydrogenated rosin, modified rosin as described and claimed in U. S. Patent to Morton No. 2,017,866, gum damar, gum elemi, or other naturally occurring or synthetic resinous materials such as halogenated diphenyl resins, resins of the polybasic acid-polyhydric alcohol type, and resins of the vinyl type. The particular blending agent to be used depends upon the film-former which is employed and also upon the properties desired in the coatings to be obtained therefrom. In some cases the blending agent can be dispensed with entirely, particularly when a wax-compatible film-former or one which has a high degree of wax tolerance is used in the preparation of the moistureproofing composition. Furthermore, it is not essential that the blending agent be a resinous material; it may, for example, be a balsam-like material, either synthetic or naturally occurring, or it may be a simple chemical compound which may or may not also possess plasticizing action for the film-former, such as dodecyl acid phthalate, bis-dodecyl phthalate, the monobutyl ester of the dibasic acid obtained by the condensation of maleic anhydride and terpinene, retene, butyl stearate, and the like.

When it is desired, a suitable plasticizer may also be used. This plasticizer may be one of those well known in the moistureproofing art such as dibutyl phthalate, dicyclohexyl phthalate, bis-butoxyethyl phthalate, tricresyl phosphate, n-butyl toluene sulfonamide, butyl phthalyl butyl glycollate, dodecyl benzoyl benzoate, etc. The plasticizer may also be one that is soluble in the same solution as the film forming ingredient. For example, with acid soluble film-formers, acid soluble plasticizers may be used such as high molecular weight aliphatic amines. In the case of basic soluble film-formers, basic soluble plasticizers such as higher alcohol half esters of dibasic acids may be used.

When the composition is to be used to coat water sensitive films or pellicles in the wet or gel state, such as regenerated cellulose, it is preferred also to add to the composition a softener for said sheets or films such as glycerin, ethylene glycol or the like, or any other softener suitable for the particular water-sensitive cellulosic material which is to be coated. It is preferred, of course, to apply the coating while the pellicles are in the gel state, since otherwise they would have to undergo two drying steps, one after and one before coating. The quantity of softener may be varied, depending upon the properties desired in the dry sheet and the use to which it is to be put. When these compositions are to be used for moistureproofing other cellulosic materials which are coagulated and/or regenerated from aqueous dispersions or solutions, they may contain any softener suitable for the particular cellulosic material which is to be coated. When the composition is used for the moistureproofing of dry cellulosic sheeting, such as cellulose acetate or ethyl cellulose or the like, or other dry materials, such as wood, metal or the like, the softener is preferably omitted. When these materials are water-repellent or non-water-sensitive, it is usually desirable to add a wetting agent to the composition. Suitable wetting agents are long-chain aliphatic amines, such as heptadecylamine, oleylamine, octadecylamine, dodecyl sulfate, naphthene sulfonic acid, saponin, etc.

It may also be desirable, in some cases, to add to the composition a long-chain aliphatic acid, such as stearic acid, palmitic acid, oleic acid, ricinoleic acid, castor oil acids, drying oil acids, etc. These acids, during the drying of the composition, tend to displace the acid portion of the amino polymer salt when said acid portion comprises a volatile acid, such as acetic acid, thus forming long-chain acid salts of the amino polymers. These long-chain acid salts are very compatible with paraffin and are less water-sensitive than the free polymers.

All the above ingredients, of course, together with others that may be added, such as pigments, fire retardants, bactericides, etc., must be such that they will not harmfully affect the composition as a whole or any of its ingredients, such as by coagulation or precipitation.

It is important that the moistureproofing agent be present in a suitable state of subdivision in order to get the best transparency and moisture-proofness. The average particle size of the wax, for example, should always be less than 4 microns in diameter and preferably between 0.5 and 2 microns and even less in diameter. Coatings containing a moistureproofing agent of less than 1 micron in average diameter, for example, become transparent, even when dried at room temperature.

The moistureproofing agent is usually employed in the form of a solution in an organic solvent, such solution being subsequently dispersed or emulsified in the aqueous solution of the film-former. Such a solvent for the moistureproofing agent may occasionally be dispensed with but it facilitates the dispersion and improves the transparency of the resulting coating to use such a solvent. The preferred solvent is xylene. It accomplishes improvement in transparency by aiding in the coalescence of the coating during drying, partly by means of its solvent action on the ingredients soluble therein but also because coatings prepared with the use of a small amount of xylene usually have their water insoluble ingredients in very small particle size. Substances other than xylene that have been found suitable are cyclohexanol, cyclohexanone, toluene, butyl acetate and others. In general, it is desirable that the solvent used be substantially insoluble or only slightly soluble in water, have a relatively high boiling point (usually higher than 100° C. and preferably higher than 120° C.) and contain a cyclic or an aromatic nucleus.

The blending agent above-mentioned is also preferably added to the solution of the moistureproofing agent and an organic solvent since the blending agent is usually soluble in this solution and insoluble in the aqueous solution containing the film-former. The plasticizer, if present and if insoluble in the aqueous solution containing the film-former, may also be added to the solution of the moistureproofing agent or alternatively, if the plasticizer is in the form of a liquid, dispersed directly in the aqueous phase, such as by the aid of a colloid mill. If the plasticizer is soluble in the solution containing the film-former, it is preferably dissolved in the latter.

The solution containing the moistureproofing agent, and other ingredients, called hereinafter the "disperse phase", is dispersed in the solution containing the film-former, called hereinafter the "aqueous phase", by any desired means, such as by the use of a colloid mill, preferably at a temperature somewhat above room temperature. For convenience sake, the dispersion is usually carried out by dispersing the disperse phase in only a small portion, such as 15%, of the aqueous phase or in a small quantity of a dispersing medium somewhat similar in composition to the aqueous phase. The dispersion is then mixed by ordinary methods with the remainder of the aqueous phase.

The proper proportion for the ingredients of the compositions of the present invention are best established by test and will depend, in general, on the ingredients chosen, particularly the film-former and the blending agent, and the specific purpose for which the composition is to be used. The qualities desired, for example, are clarity, flexibility, resistance to smearing, slip, moistureproofness, etc. Since it is usually true with some of these properties that an improvement in one is accompanied by an impairment in the other characteristics, the composition selected will preferably have the most favorable possible combination of properties. It has been found that the best formulations will fall in the following ranges, which refer to the percentages of materials in the final dried coating:

Film-former---- 25–99% and preferably 35–90%
Moistureproofing agent------------------
-------------- 1–25% and preferably 3–20%
Blending agent  0–50% and preferably 5–35%
Plasticizer------ 0–30% and preferably 0–20%

Having described the invention above, the following specific examples are now given although these are to be understood as being illustrative and not limitative:

EXAMPLE I

Aqueous phase

| | Parts |
|---|---|
| Interpolymer of dicyclohexylaminoethyl alpha methacrylate and dimethylaminoehyl alpha methacrylate (ratio 70:30 parts by weight) | 72.5 |
| Interpolymer of dicyclohexylaminoethyl alpha methacrylate and dimethylaminoethyl alpha methacrylate (ratio 65:35 parts by weight) | 6.5 |
| Acetic acid | 54.5 |
| Glycerin | 56.0 |
| Water | 1184.0 |

Disperse phase

| | Parts |
|---|---|
| Modified rosin | 18.5 |
| Paraffin wax (melting point 62–64° C.) | 9.0 |
| Xylene | 27.0 |

The disperse phase is dispersed in the aqueous phase with the aid of a colloid mill at a temperature of 30–45° C. until the average particle size of wax is 2–4 microns in diameter.

EXAMPLE II

Aqueous phase

| | Parts |
|---|---|
| Interpolymer of dicyclohexylaminoethyl alpha methacrylate and dimethylaminoethyl alpha methacrylate (ratio 70:30 parts by weight) | 79.2 |
| Acetic acid | 54.6 |
| Water | 1151.0 |
| Glycerin | 61.2 |

Dispersing medium

| | Parts |
|---|---|
| Interpolymer of dicyclohexylaminoethyl alpha methacrylate and dimethylaminoethyl alpha methacrylate (ratio 65:35 parts by weight) | 7 |
| Acetic acid | 5 |
| Water | 128 |

Disperse phase

| | Parts |
|---|---|
| Modified rosin | 20 |
| Paraffin wax (melting point 62–64° C.) | 10 |
| Xylene | 30 |

The disperse phase is added to the dispersing medium and the mixture circulated through a colloid mill at a temperature of about 35° C. until a finely divided emulsion is obtained. This emulsion is mixed by ordinary methods with the aqueous phase.

The proportions of the ingredients in Examples I and II can be varied to produce final coatings having the following preferred limits:

Interpolymer of dicyclohexylaminoethyl alpha methacrylate and dimethylaminoethyl alpha methacrylate (ratio 70:30 parts by weight)
  _____ 65–85% (especially 69–79%)
Modified rosin ____ 10–22.5% (especially 14–20%)
Paraffin wax (melting point 62–64° C.)
  _____ 2.5–17.5% (especially 6–15%)

EXAMPLE III

Dispersing medium

| | Parts |
|---|---|
| Interpolymer of dicyclohexylaminoethyl alpha-methacrylate and dimethylaminoethyl alpha-methacrylate (ratio 65:35 parts by weight) | 10 |
| Acetic acid | 8 |
| Water | 181 |

Disperse phase

| | Parts |
|---|---|
| Modified rosin | 28.3 |
| Paraffin wax (melting point 62–64° C.) | 14.2 |
| Xylene | 42.5 |

The disperse phase is dispersed in the dispersing medium as in Example II. 5.75 parts of dibutyl phthalate are then dispersed by means of a colloid mill at a temperature of 30–40° C. in the following composition:

| | Parts |
|---|---|
| Interpolymer of dicyclohexylaminoethyl alpha-methacrylate and dimethylaminoethyl alpha-methacrylate (ratio 65:35 parts by weight) | 1.2 |
| Acetic acid | .85 |
| Water | 49.8 |

Both of the above dispersions are then mixed by ordinary means with the following composition:

Aqueous phase

| | Parts |
|---|---|
| Interpolymer of dicyclohexylaminoethyl alpha-methacrylate and dimethylaminoethyl alpha-methacrylate (ratio 70:30 parts by weight) | 51.75 |
| Acetic acid | 40.0 |
| Water | 935.0 |
| Glycerin | 57.0 |

The proportions of the ingredients of Example III may be varied somewhat to give final coatings within the following preferred limits:

Interpolymer of dicyclohexylaminoethyl alpha-methacrylate and dimethylaminoethyl alpha-methacrylate
  _____ 47–69% (especially 49–63%)
Modified rosin ____ 17.5–32% (especially 22–30%)
Paraffin wax ____ 7.5–22.5% (especially 10–20%)
Dibutyl phthalate
  _____ 3.5–7.5% (especially 4.4–6.3%)

EXAMPLE IV

Aqueous phase

| | Parts |
|---|---|
| Dicyclohexylaminoethyl alpha-methacrylate and dimethylaminoethyl alpha-methacrylate (ratio 70:30 parts by weight) | 10 |
| Acetic acid | 20 |
| Water | 210 |
| Glycerin | 10 |

Disperse phase

| | Parts |
|---|---|
| Paraffin wax (melting point 62–64° C.) | 1 |

The disperse phase is dispersed in the aqueous phase with the use of a colloid mill as described in Example I. The coatings formed therefrom are somewhat soft and show a slight haze. The transparency can be improved by adding 2 to 4 parts of xylene to the disperse phase.

Example V

Aqueous phase

| | Parts |
|---|---|
| Interpolymer of dicyclohexylaminoethyl alpha-methacrylate and dimethylaminoethyl alpha-methacrylate (ratio 65:35 parts by weight) | 5 |
| Acetic acid | 3.5 |
| Heptadecylamine | 0.25 |
| Glycerin | 10.00 |
| Water | 197.00 |

Disperse phase

| | Parts |
|---|---|
| Cyclohexyl alpha-methacrylate | 20 |
| Modified rosin | 6 |
| Dibutyl phthalate | 3 |
| Dicyclohexyl phthalate | 3 |
| Paraffin wax (melting point 62-64° C.) | 2 |
| Benzoyl peroxide | 0.30 |

The disperse phase is dispersed in the aqueous phase by means of a colloid mill maintained at a temperature of 40-80° C. This composition will dry to a transparent coating at room temperature and is therefore admirably suited to coating materials where forced drying may be undesirable.

Example VI

Aqueous phase

| | Parts |
|---|---|
| Interpolymer of dicyclohexylaminoethyl alpha-methacrylate and methyl vinyl ketone (ratio 75:56 parts by weight) | 7 |
| Acetic acid | 9 |
| Glycerin | 6 |
| Water | 128 |

Disperse phase

| | Parts |
|---|---|
| Modified rosin | 2 |
| Paraffin wax (melting point 62-64° C.) | 1 |
| Xylene | 3 |

The disperse phase is dispersed in the aqueous phase by means of a colloid mill as in the previous examples.

Example VII

Aqueous phase

| | Parts |
|---|---|
| Interpolymer of dicyclohexylaminoethyl alpha-methacrylate and dimethylaminoethyl alpha-methacrylate (ratio 70:30 parts by weight) | 3.5 |
| Resin prepared by the condensation of 1 mol of p-hydroxydiphenyl, 1.4 mols of formaldehyde, and 1 mol of dimethylaminomethanol | 3.5 |
| Acetic acid | 5.0 |
| Glycerin | 6.0 |
| Water | 132.0 |

Disperse phase

| | Parts |
|---|---|
| Modified rosin | 1.75 |
| Paraffin wax (melting point 62-64° C.) | 1.25 |
| Xylene | 3.00 |

The dispersed phase is dispersed in the aqueous phase with the aid of a colloid mill as described in the previous examples.

Example VIII

Aqueous phase

| | Parts |
|---|---|
| Dicyclohexylaminoethyl alpha-methacrylate and dimethylaminoethyl alpha-methacrylate (ratio 70:30 parts by weight) | 3 |
| Acetic acid | 7 |
| Glycerin | 10 |
| Water | 192 |

Disperse phase

| | Parts |
|---|---|
| Stearic acid | 6 |
| Modified rosin | 5.5 |
| Paraffin wax (melting point 62-64° C.) | 1.7 |
| Xylene | 10.0 |

The disperse phase is dispersed in the aqueous phase with the aid of a colloid mill as in the previous examples. When the glycerin is omitted from this composition, it is suitable for coating wood or metal.

In the coating of pellicles or films, the compositions according to the present invention are preferably applied by passing the pellicle through a bath containing the composition. After the coating composition is applied, the excess is removed by doctor knives or other means. The coated material is then dried in any suitable manner. For example, it may be dried on frames or supported at the edges at a temperature from 80 to 200° C. Preferably the coating may be dried and the sheet partially dried very rapidly at high temperatures, such as by radiators at 500 to 1500° C. or flames or hot gases very close to the sheet, as described in copending applications to Eberlin, Serial No. 46,326, and to Charch, Serial No. 46,325, both filed on October 23, 1935. Subsequently the drying may be completed on rolls at a temperature of 40-85° C. and preferably 50-75° C., as well known in the art of drying non-fibrous sheets and films. In order to get the proper degree of moistureproofness and transparency, the coated pellicle is preferably subjected to a temperature in excess of the melting point of the moistureproofing agent, such as 100-115° C., at some stage of the operation.

The compositions of the present invention are capable of yielding highly moistureproof and transparent coatings. The moistureproofness of these coatings is such that they show permeability values of the order of 500, 400, 300, 100, 30 and in many cases even less. The coatings or films are flexible, durable, resistant to smearing and in general as satisfactory as those obtained with moistureproofing compositions prepared with the use of organic solvents. They require the use of no expensive solvent and, at worst, only a very minor quantity of an organic solvent. They require no solvent recovery system and entail practically no cost for solvent loss. When applied to water sensitive films, they require no separate coating operation since they can be applied directly to the film in the gel state during its process of treatment on the casting machine and dried at the same time as the film itself.

These compositions are suitable for moistureproofing all kinds of materials including paper, leather, textiles, wood, film, synthetic or natural fibers, filaments, etc. They are particularly suitable for moistureproofing non-fibrous cellulosic pellicles, such as cellulose ethers and mixed ethers, cellulose esters and mixed esters, cellulose ester ethers and especially sheets of water sensitive cellulosic materials obtained by coagulation and/or regeneration of aqueous solutions or dispersions of cellulose derivatives such as cellulose xanthate, low substituted cellulose derivative such as low substituted methyl cellulose, glycol cellulose, cellulose glycollic acid, amino celluloses and the like. Similarly, they are suitable for moistureproofing sheets of other non-fibrous materials, such as gelatin, casein, synthetic resinous materials, rubber hydrochloride, etc. They also may be cast in the form of self-sustaining sheets or films in a manner well known to the art.

The term "amino polymer" as used throughout the present specification and claims, unless otherwise modified, is intended to include amino polymers per se or in the form of their salts. The term "wax" is intended to include both true waxes and wax-like materials such as paraffin. The term "rosin" unless otherwise modified, is intended to include commercial rosin, rosinates, and modified rosin. The term "modified rosins" is defined as the rosin described and claimed in U. S. Letters Patent to Morton No. 2,017,866. This modified rosin is characterized generally by properties similar to those of rosin, but with the difference that it has a molecular weight within the range 5% to 400% greater than ordinary rosin in its pure state; that it has a melting point, as determined by the capillary tube method, above 80° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

The term "total solids" in a moistureproofing composition is understood to include all those ingredients which remain in the final product after the water and other solvents are removed therefrom, whether or not one or more of these ingredients, such as a plasticizer, are actually liquids or solids.

Any variation of or modification of the invention as has been described above in this application, which conforms to the spirit of the invention, is intended to be included within the scope of the claims.

I claim—

1. A moistureproofing composition comprising an aqueous solution of the salt of an amino polymer, which polymer is substantially insoluble in water and in 5% aqueous ammonia but soluble in 2% aqueous acetic acid and in toluene, and dispersed therein a moistureproofing agent, the ingredients of the composition being present in such proportions as to form a moistureproof, flexible, smear-resistant film upon evaporation of the water at an elevated temperature.

2. A moistureproofing composition comprising an aqueous solution of the salt of an amino polymer, which polymer is substantially insoluble in water and in 5% aqueous ammonia but soluble in 2% aqueous acetic acid and in toluene, and dispersed therein a moistureproofing agent and a blending agent, the ingredients of the composition being present in such proportions as to form a moistureproof, flexible, smear-resistant film upon evaporation of the water at an elevated temperature.

3. A moistureproofing composition comprising an aqueous solution of the salt of an amino polymer, which polymer is substantially insoluble in water and in 5% aqueous ammonia but soluble in 2% aqueous acetic acid and in toluene, and dispersed therein a moistureproofing agent, blending agent, and a plasticizer, the ingredients of the composition being present in such proportions as to form a moistureproof, flexible, smear-resistant film upon evaporation of the water at an elevated temperature.

4. A moistureproofing composition comprising an aqueous solution of the salt of an amino polymer, which polymer is substantially insoluble in water and in 5% aqueous ammonia but soluble in 2% aqueous acetic acid and in toluene, and dispersed therein a wax, rosin, and a plasticizer, the ingredients of the composition being present in such proportions as to form a moistureproof, flexible, smear-resistant film upon evaporation of the water at an elevated temperature.

5. A moistureproofing composition comprising an aqueous solution of the salt of an amino polymer, which polymer is substantially insoluble in water and in 5% aqueous ammonia but soluble in 2% aqueous acetic acid and in toluene, and dispersed therein an emulsion containing a moistureproofing agent and modified rosin in an organic solvent, the ingredients of the composition being present in such proportions as to form a moistureproof, flexible, smear-resistant film upon evaporation of the water at an elevated temperature, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

6. A moistureproofing composition comprising an aqueous solution of the salt of a polymerized amino alcohol ester of acrylic acid or of its homologues substituted in the alpha position by a hydrocarbon radical, said polymerized ester being soluble in 2% aqueous acetic acid and in toluene, and dispersed therein a moistureproofing agent, the ingredients of the composition being present in such proportions as to form a moistureproof, flexible, smear-resistant film upon evaporation of the water at an elevated temperature.

7. A moistureproofing composition comprising an aqueous solution of the salt of a polymerized amino alcohol ester of methacrylic acid which ester is soluble in 2% aqueous acetic acid and in toluene, and dispersed therein a moistureproofing agent, the ingredients of the composition being present in such proportions as to form a moistureproof, flexible, smear-resistant film upon evaporation of the water at an elevated temperature.

8. A moistureproofing composition comprising an aqueous solution of the salt of a polymerized amino alcohol ester of methacrylic acid which ester is soluble in 2% aqueous acetic acid and in toluene, and dispersed therein a moistureproofing agent and a blending agent, the ingredients of the composition being present in such proportions as to form a moistureproof, flexible, smear-resistant film upon evaporation of the water at an elevated temperature.

9. A moistureproofing composition comprising an aqueous solution of the salt of a polymerized amino alcohol ester of methacrylic acid which ester is soluble in 2% aqueous acetic acid and in toluene, and dispersed therein a moisture proofing agent, a blending agent, and a plasticizer, the ingredients of the composition being present in such proportions as to form a moistureproof, flexible, smear-resistant film upon evaporation of the water at an elevated temperature.

10. A moistureproofing composition comprising an aqueous solution of the salt of a polymerized amino alcohol ester of methacrylic acid which ester is soluble in 2% aqueous acetic acid and in toluene, and dispersed therein a wax, rosin, and a plasticizer, the ingredients of the composition being present in such proportions as to form a moistureproof, flexible, smear-resistant film upon evaporation of the water at an elevated temperature.

11. A moistureproofing composition comprising an aqueous solution of the salt of a polymerized amino alcohol ester of methacrylic acid which ester is soluble in 2% aqueous acetic acid and in toluene, and dispersed therein an emulsion containing a moistureproofing agent and modified rosin in an organic solvent, the ingredients of the composition being present in such proportions as to form a moistureproof, flexible, smear-resistant film upon evaporation of the water at an elevated temperature, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

12. A moistureproofing composition comprising an aqueous solution of the salt of an amino polymer, which polymer is substantially insoluble in water and in 5% aqueous ammonia but soluble in 2% aqueous acetic acid and in toluene, and dispersed therein a moistureproofing agent, a blending agent, and a plasticizer, the total solids of said composition comprising 25% to 99% amino polymer, 1% to 25% moistureproofing agent, a substantial amount to 50% blending agent, and a substantial amount to 30% plasticizer.

13. A moistureproofing composition comprising an aqueous solution of the salt of an amino polymer, which polymer is substantially insoluble in water and in 5% aqueous ammonia but soluble in 2% aqueous acetic acid and in toluene, and dispersed therein a moistureproofing agent, a blending agent, and a plasticizer, the total solids of said composition comprising 35% to 90% amino polymer, 3% to 20% moistureproofing agent, 5% to 35% blending agent, and a substantial amount to 20% plasticizer.

14. A moistureproofing composition comprising an aqueous solution of the salt of a polymerized amino alcohol ester of methacrylic acid, which ester is soluble in 2% aqueous acetic acid and in toluene, and dispersed therein a moistureproofing agent, a blending agent, and a plasticizer, the total solids of said composition comprising 25% to 99% polymerized amino alcohol ester of methacrylic acid, 1% to 25% moistureproofing agent, a substantial amount to 50% blending agent and a substantial amount to 30% plasticizer.

15. A moistureproofing composition comprising an aqueous solution of the salt of a polymerized amino alcohol ester of methacrylic acid, which ester is soluble in 2% aqueous acetic acid and in toluene, and dispersed therein a moistureproofing agent, a blending agent, and a plasticizer, the total solids of said composition comprising 35% to 90% polymerized amino alcohol ester of methacrylic acid, 3% to 20% moistureproofing agent, 5% to 35% blending agent and a substantial amount to 20% plasticizer.

16. A moistureproofing composition comprising an aqueous acetic acid solution of an interpolymer of dicyclohexylaminoethyl alpha-methacrylate and dimethylaminoethyl alpha-methacrylate, and dispersed therein a moistureproofing agent, the ingredients of the composition being present in such proportions as to form a moistureproof, flexible, smear-resistant film upon evaporation of the water at an elevated temperature.

17. A moistureproofing composition comprising an aqueous acetic acid solution of an interpolymer of dicyclohexylaminoethyl alpha-methacrylate and dimethylaminoethyl alpha-methacrylate, and dispersed therein a moistureproofing agent and a blending agent, the ingredients of the composition being present in such proportions as to form a moistureproof, flexible, smear-resistant film upon evaporation of the water at an elevated temperature.

18. A moistureproofing composition comprising an aqueous acetic acid solution of an interpolymer of dicyclohexylaminoethyl alpha-methacrylate and dimethylaminoethyl alpha-methacrylate, and dispersed therein a moistureproofing agent, a blending agent, and a plasticizer, the ingredients of the composition being present in such proportions as to form a moistureproof, flexible, smear-resistant film upon evaporation of the water at an elevated temperature.

19. A moistureproofing composition comprising an aqueous acetic acid solution of an interpolymer of dicyclohexylaminoethyl alpha-methacrylate and dimethylaminoethyl alpha-methacrylate, and dispersed therein a wax, rosin, and a plasticizer, the ingredients of the composition being present in such proportions as to form a moistureproof, flexible, smear-resistant film upon evaporation of the water at an elevated temperature.

20. A moistureproofing composition comprising an aqueous acetic acid solution of an interpolymer of dicyclohexylaminoethyl alpha-methacrylate and dimethylaminoethyl alpha-methacrylate, and dispersed therein an emulsion containing a moistureproofing agent and modified rosin in an organic solvent, the ingredients of the composition being present in such proportions as to form a moistureproof, flexible, smear-resistant film upon evaporation of the water at an elevated temperature, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

21. A moistureproofing composition comprising an aqueous acetic acid solution of an interpolymer of dicyclohexylaminoethyl alpha-methacrylate and dimethylaminoethyl alpha-methacrylate, and dispersed therein a moistureproofing agent, a blending agent, and a plasticizer, the total solids of said composition comprising 25% to 99% interpolymer of dicyclohexylaminoethyl alpha-methacrylate and dimethylaminoethyl alpha-methacrylate, 1% to 25% moistureproofing agent, a substantial amount to 50% blending agent and a substantial amount to 30% plasticizer.

22. A moistureproofing composition comprising an aqueous acetic acid solution of an interpolymer of dicyclohexylaminoethyl alpha-methacrylate and dimethylaminoethyl alpha-methacrylate, and dispersed therein a moistureproofing agent, a blending agent, and a plasticizer, the total solids of said composition comprising 35% to 90% interpolymer of dicyclohexylaminoethyl alpha-methacrylate and dimethylaminoethyl alpha-methacrylate, 3% to 20% moistureproofing agent, 5% to 35% blending agent and a substantial amount to 20% plasticizer.

23. The method of moistureproofing comprising applying to a material to be moistureproofed a moistureproofing composition comprising an aqueous solution of the salt of an amino polymer, which polymer is substantially insoluble in water and in 5% aqueous ammonia but soluble in 2% aqueous acetic acid and in toluene, said composition having dispersed therein a moistureproofing agent, and then drying said composition at a temperature above the melting point of the moistureproofing agent.

24. The method of moistureproofing non-fibrous pellicles comprising applying to said pellicles a moistureproofing composition comprising an aqueous solution of the salt of an amino polymer, which polymer is substantially insoluble in water and in 5% aqueous ammonia but soluble in 2% aqueous acetic acid and in toluene, said composition having dispersed therein a moistureproofing agent, and then drying said composition at a temperature above the melting point of the moistureproofing agent.

25. The method of moistureproofing non-fibrous water-sensitive pellicles comprising applying to said pellicles in the wet state a moistureproofing composition comprising an aqueous solution of the salt of an amino polymer, which polymer is substantially insoluble in water and in 5% aqueous ammonia but soluble in 2% aqueous acetic acid and in toluene, said composition having dispersed therein a moistureproofing agent and a blending agent, and then drying said composition at a temperature above the melting point of the moistureproofing agent.

26. The method of moistureproofing non-fibrous water-sensitive pellicles comprising applying to said pellicles in the gel state a moistureproofing composition comprising an aqueous volatile acid solution of a polymerized amino alcohol ester of methacrylic acid which ester is soluble in 2% aqueous acetic acid and in toluene, said composition having dispersed therein a moistureproofing agent, a blending agent, and a plasticizer, and then simultaneously drying at a temperature above the melting point of the moistureproofing agent and rendering said composition insoluble in water by removing the acid therefrom.

27. The method of moistureproofing non-fibrous water-repellant pellicles comprising applying to said pellicles a moistureproofing composition comprising an aqueous acid solution of a wetting agent and a polymerized amino alcohol ester of a methacrylic acid which ester is soluble in 2% aqueous acetic acid and in toluene, said composition having dispersed therein a moistureproofing agent, and then drying said composition at a temperature above the melting point of the moistureproofing agent.

28. An article of manufacture comprising a base coated with a composition comprising a moistureproofing agent and a film-forming agent composed of an amino polymer, which polymer is substantially insoluble in water and in 5% aqueous ammonia but soluble in 2% aqueous acetic acid and in toluene, the ingredients of the coating composition being present in such proportions as to form a moistureproof, flexible, smear-resistant coating.

29. An article of manufacture comprising a non-fibrous pellicle coated with a composition comprising a moistureproofing agent and a film-forming agent composed of an amino polymer, which polymer is substantially insoluble in water and in 5% aqueous ammonia but soluble in 2% aqueous acetic acid and in toluene, the ingredients of the coating composition being present in such proportions as to form a moistureproof, flexible, smear-resistant coating.

30. An article of manufacture comprising a non-fibrous water-sensitive pellicle coated with a composition comprising a moistureproofing agent and a film-forming agent composed of an amino polymer, which polymer is substantially insoluble in water and in 5% aqueous ammonia but soluble in 2% aqueous acetic acid and in toluene, the ingredients of the coating composition being present in such proportions as to form a moistureproof, flexible, smear-resistant coating.

31. An article of manufacture comprising a non-fibrous water-sensitive pellicle coated with a composition comprising a moistureproofing agent, a blending agent, and a film-forming agent composed of an amino polymer, which polymer is substantially insoluble in water and in 5% ammonia but soluble in 2% aqueous acetic acid and in toluene, the ingredients of the coating composition being present in such proportions as to form a moistureproof, flexible, smear-resistant coating.

32. An article of manufacture comprising a non-fibrous water-sensitive pellicle coated with a composition comprising a moistureproofing agent, a blending agent, and a film-forming agent composed of a polymerized amino alcohol ester of methacrylic acid, which ester is soluble in 2% aqueous acetic acid and in toluene, the ingredients of the coating composition being present in such proportions as to form a moistureproof, flexible, smear-resistant coating.

33. An article of manufacture comprising a non-fibrous water-sensitive pellicle coated with a composition comprising a moistureproofing agent, a blending agent, a plasticizer, and a film-forming agent composed of a polymerized amino alcohol ester of methacrylic acid, which ester is soluble in 2% aqueous acetic acid and in toluene, the ingredients of the coating composition being present in such proportions as to form a moistureproof, flexible, smear-resistant coating.

34. An article of manufacture comprising a non-fibrous water-sensitive pellicle coated with a composition comprising a wax, modified rosin, a plasticizer, and a film-forming agent composed of an interpolymer of dicyclohexylaminoethyl alpha-methacrylate and dimethylaminoethyl alpha-methacrylate, the ingredients of the coating composition being present in such proportions as to form a moistureproof, flexible, smear-resistant coating, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

35. An article of manufacture comprising a regenerated cellulose pellicle coated with a composition comprising a moistureproofing agent and a film-forming agent composed of an amino polymer, which polymer is substantially insoluble in water and in 5% aqueous ammonia but soluble in 2% aqueous acetic acid and in toluene, the ingredients of the coating composition being present in such proportions as to form a moistureproof, flexible, smear-resistant coating.

36. An article of manufacture comprising a regenerated cellulose pellicle coated with a composition comprising a moistureproofing agent, a blending agent, and a film-forming agent composed of an amino polymer, which polymer is substantially insoluble in water and in 5% aqueous ammonia but soluble in 2% aqueous acetic acid and in toluene, the ingredients of the coating composition being present in such proportions as to form a moistureproof, flexible, smear-resistant coating.

37. An article of manufacture comprising a regenerated cellulose pellicle coated with a composition comprising a moistureproofing agent, a blending agent, and a film-forming agent composed of a polymerized amino alcohol ester of methacrylic acid, which ester is soluble in 2% aqueous acetic acid and in toluene, the ingredients of the coating composition being present in such proportions as to form a moistureproof, flexible, smear-resistant coating.

38. An article of manufacture comprising a regenerated cellulose pellicle coated with a composition comprising a moistureproofing agent, a blending agent, a plasticizer, and a film-forming agent composed of a polymerized amino alcohol ester of methacrylic acid, which ester is soluble in 2% aqueous acetic acid and in toluene, the ingredients of the coating composition being present in such proportions as to form a moistureproof, flexible, smear-resistant coating.

39. An article of manufacture comprising a regenerated cellulose pellicle coated with a composition comprising a wax, modified rosin, a plasticizer, and a film-forming agent composed pha-methacrylate, and dimethylaminoethyl alpha-methacrylate, the ingredients of the coating pha-methacrylate, the ingredients of the coating composition being present in such proportions as to form a moistureproof, flexible, smear-resistant coating, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than of pure abietic acid; and that it has a molecular weight higher than that of pure abietic acid.

FREDERICK M. MEIGS.

CERTIFICATE OF CORRECTION.

Patent No. 2,169,366.                     August 15, 1939.

FREDERICK M. MEIGS.

It is hereby certified that error appears in the printed specification of the above numbered patent requiring correction as follows: Page 9, second column, lines 20 to 23 inclusive, claim 39, strike out the words "and a film-forming agent composed pha-methacrylate, and dimethylaminoethyl alpha-methacrylate, the ingredients of the coating pha-methacrylate" and insert instead and a film-forming agent composed of an interpolymer of dicyclohexylaminoethyl alpha-methacrylate and dimethylaminoethyl alpha-methacrylate; and that the said Letters Patent should be read with this correction therein that the same may conform to the record of the case in the Patent Office.

Signed and sealed this 24th day of October, A. D. 1939

(Seal)

Henry Van Arsdale,
Acting Commissioner of Patents.

composition being present in such proportions as to form a moistureproof, flexible, smear-resistant coating, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

35. An article of manufacture comprising a regenerated cellulose pellicle coated with a composition comprising a moistureproofing agent and a film-forming agent composed of an amino polymer, which polymer is substantially insoluble in water and in 5% aqueous ammonia but soluble in 2% aqueous acetic acid and in toluene, the ingredients of the coating composition being present in such proportions as to form a moistureproof, flexible, smear-resistant coating.

36. An article of manufacture comprising a regenerated cellulose pellicle coated with a composition comprising a moistureproofing agent, a blending agent, and a film-forming agent composed of an amino polymer, which polymer is substantially insoluble in water and in 5% aqueous ammonia but soluble in 2% aqueous acetic acid and in toluene, the ingredients of the coating composition being present in such proportions as to form a moistureproof, flexible, smear-resistant coating.

37. An article of manufacture comprising a regenerated cellulose pellicle coated with a composition comprising a moistureproofing agent, a blending agent, and a film-forming agent composed of a polymerized amino alcohol ester of methacrylic acid, which ester is soluble in 2% aqueous acetic acid and in toluene, the ingredients of the coating composition being present in such proportions as to form a moistureproof, flexible, smear-resistant coating.

38. An article of manufacture comprising a regenerated cellulose pellicle coated with a composition comprising a moistureproofing agent, a blending agent, a plasticizer, and a film-forming agent composed of a polymerized amino alcohol ester of methacrylic acid, which ester is soluble in 2% aqueous acetic acid and in toluene, the ingredients of the coating composition being present in such proportions as to form a moistureproof, flexible, smear-resistant coating.

39. An article of manufacture comprising a regenerated cellulose pellicle coated with a composition comprising a wax, modified rosin, a plasticizer, and a film-forming agent composed pha-methacrylate, and dimethylaminoethyl alpha-methacrylate, the ingredients of the coating pha-methacrylate, the ingredients of the coating composition being present in such proportions as to form a moistureproof, flexible, smear-resistant coating, said modified rosin being characterized by properties of the general nature of those of rosin, but with the difference that it has a molecular weight within the range 5% to 400% greater than ordinary rosin in its pure state; that it has a melting point, as determined by the capillary tube method, above 85° C. and higher than the melting point of pure abietic acid and of purified rosin when in the resinous state; that it is substantially free from combined sulfur and hardening substances held in combination; that it has an iodine value lower than of pure abietic acid; and that it has a molecular weight higher than that of pure abietic acid.

FREDERICK M. MEIGS.

CERTIFICATE OF CORRECTION.

Patent No. 2,169,366.   August 15, 1939.

FREDERICK M. MEIGS.

It is hereby certified that error appears in the printed specification of the above numbered patent requiring correction as follows: Page 9, second column, lines 20 to 23 inclusive, claim 39, strike out the words "and a film-forming agent composed pha-methacrylate, and dimethylaminoethyl alpha-methacrylate, the ingredients of the coating pha-methacrylate" and insert instead and a film-forming agent composed of an interpolymer of dicyclohexylaminoethyl alpha-methacrylate and dimethylaminoethyl alpha-methacrylate; and that the said Letters Patent should be read with this correction therein that the same may conform to the record of the case in the Patent Office.

Signed and sealed this 24th day of October, A. D. 1939

(Seal)

Henry Van Arsdale,
Acting Commissioner of Patents.